United States Patent
Kay

(10) Patent No.: US 6,729,331 B2
(45) Date of Patent: May 4, 2004

(54) PRESSURE REGULATOR

(76) Inventor: Francis Xavier Kay, The Old School House Church Hill, Akeley, Buckinghamshire (GB), MK18 5HB ( * ) Notice: Subject to any disclaimer, the term of this patent is extended or adjusted under 35 U.S.C. 154(b) by 0 days.

(21) Appl. No.: 10/140,392

(22) Filed: May 7, 2002

(65) Prior Publication Data

US 2003/0000529 A1 Jan. 2, 2003

(30) Foreign Application Priority Data

May 29, 2001 (GB) .............................................. 0112958

(51) Int. Cl.[7] ................................................ A62B 7/04
(52) U.S. Cl. ........................... 128/205.24; 128/201.28; 128/203.11; 128/206.15; 128/207.12; 128/201.27; 128/204.26
(58) Field of Search ....................... 128/205.24, 201.28, 128/203.11, 206.15, 207.12, 201.27, 204.26, 204.25, 205.22, 204.28, 207.16, 204.18; 137/414, 908

(56) References Cited

U.S. PATENT DOCUMENTS

| | | | | |
|---|---|---|---|---|
| 4,219,017 A | * | 8/1980 | Shamlian et al. | 128/204.26 |
| 4,436,090 A | * | 3/1984 | Darling | 128/204.26 |
| 5,357,950 A | * | 10/1994 | Wippler et al. | 128/205.24 |
| 5,839,436 A | * | 11/1998 | Fangrow et al. | 128/205.24 |

FOREIGN PATENT DOCUMENTS

| | | | | |
|---|---|---|---|---|
| GB | 2 158 198 A | | 11/1985 | |
| GB | 2 184 814 A | | 7/1987 | |
| GB | 2298026 A | * | 8/1996 | .......... G05D/16/10 |

* cited by examiner

Primary Examiner—Henry Bennett
Assistant Examiner—Mark Rademacher
(74) Attorney, Agent, or Firm—Arnold B. Silverman; William F. Lang, IV; Eckert Seamans Cherin & Mellott, LLC

(57) ABSTRACT

A pressure regulator suitable for use as a breathing demand valve in self-contained breathing equipment comprising a first chamber incorporating an inlet port having an inlet valve therein, preferably in the form of a poppet valve and biased so as to seal of the inlet port, and separated from a second chamber by a diaphragm. The diaphragm co-operates with the end of a stem extending from the poppet valve member of the inlet valve such that, upon inhalation by the user, the diaphragm is deflected towards the inlet valve and exerts a force on the poppet valve stem sufficient to open the poppet valve and, upon exhalation by the user, the diaphragm is deflected away form the inlet valve so that the diaphragm no longer contacts the end of the poppet valve stem and the inlet valve closes. A baffle plate is positioned in between the diaphragm and inlet valve so as to prevent, when the inlet valve is open, a portion of the pressurized fluid flow from impinging upon the underside of the diaphragm and tending to close the inlet valve. Optionally, the end of the diaphragm may incorporate an exhaust port to ambient, which, when the inlet valve is opened, is sealed by the end of the poppet valve stem sealably engaging with a valve seat around the exhaust port.

19 Claims, 5 Drawing Sheets

PRESSURE REGULATOR

BACKGROUND OF THE INVENTION

1. Field of the Invention

THIS INVENTION RELATES to a pressure regulator, particularly suitable for use as a breathing demand valve system, in, for example, diving, rescue, escape and resuscitation equipment.

There are many cases in which the need to breathe depends upon a source of air, or other breathable gas, stored at a high pressure in a cylinder or bottle. The specific storage pressures of such gases varies according to the nature of the gas and the particular application but, as a general rule, the stored gas pressure may vary between 1,800 psi ($1.2 \times 10^7$ Pa) and 4,500 psi ($3.1 \times 10^7$ Pa). In order to bring the stored gas pressure to a useable level, a high pressure regulator is usually mounted on the cylinder to provide an output (set) pressure of the order of 60–105 psi ($4.1 \times 10^5$–$7.2 \times 10^5$ Pa), dependant upon the application and the particular manufacturer's design. The medium level output from the high pressure, or first stage, unit is applied to some form of breathing valve system.

2. Description of the Related Art

Such a breathing valve system, or demand valve, may be provided with a diaphragm, which typically actuates some form of inlet valve to allow flow of the medium level gas pressure, supplied from the high pressure regulator, to the mouth of the user. The inlet valve in many established designs is an unbalanced poppet valve, which is held closed against the supply pressure through the action of a light spring and is opened by deflection of the diaphragm acting against the spring. Conventionally, in order to obtain power gain from this design form, a long lever is employed to operate the inlet valve, transmitting the thrust due to the deflection of the diaphragm. Known variations include manual adjustment of the valve aperture and/or opening pressure, to suit different operating requirements or conditions.

A disadvantage of the lever actuating design described above is that, due to inevitable manufacturing tolerance variations in the various components, some selective assembly and adjustments are necessary in order to tune the function of the valve unit so as to be within acceptable performance limits.

GB 2298026 discloses an alternative arrangement for a breathing valve system, in which the inlet valve is in a pressure balanced module. The module incorporates an inlet poppet valve which is as nearly perfectly balanced as is reasonable under good quality manufacturing tolerances and conditions, so that the poppet valve can be opened directly by the thrust due to the deflection of a suitably sized diaphragm, without the need for any form of lever arrangement.

In the arrangement of GB 2298026, in order to actuate the opening of the inlet valve directly, the diaphragm is positioned opposite, and faces, the inlet valve such that, upon deflection, the diaphragm is urged against the stem of the inlet poppet valve so as to move the stem axially and consequently open the valve. Accordingly, when the valve is in an open position, a portion of the pressurised fluid flow through the valve impinges upon the underside of the diaphragm, tending to deflect the diaphragm in a direction away from the end of the poppet valve stem and thus tending to close the inlet valve, so that there is a negative feedback effect. For certain applications such as, for example, diving, there is a requirement for a relatively high maximum inhalation gas flow, with a predetermined inhalation suction, such that the negative feedback effect described above is considerable, and a point may be reached whereby no matter how much suction force is applied to the diaphragm, virtually no change in the mass gas flow delivered to the user can take place. This is because the higher the gas flow through the inlet valve, the greater the reaction force on the diaphragm tending to close of the inlet valve and reduce the mass gas flow.

SUMMARY OF THE INVENTION

It is an object of the present invention to provide a demand valve system which mitigates the self-limiting pressure problem described above According to one aspect of the present invention, there is provided a pressure regulator suitable for use as a breathing demand valve in various self-contained breathing apparatus, comprising a first chamber having an inlet port, the inlet port being connectable to the outlet of a pressurised fluid supply, an inlet valve being positioned within the inlet port and biased so as to seal the first chamber from the pressurised fluid supply, wherein the opening of the inlet valve can be actuated by the thrust due to the deflection of a diaphragm positioned so as to separate the first chamber from a second chamber, a baffle plate positioned in between the diaphragm and inlet port reducing negative feedback to the flow rate through the first chamber by preventing a portion of the pressurised fluid flow released through the open inlet valve from impinging upon, and consequently deflecting, the diaphragm in a direction tending to close the inlet valve.

For low pressure valve applications, it is known to provide breathing valve systems which employ a convoluted diaphragm. The active part of the diaphragm can be made relatively thin and flexible, making for a sensitive diaphragm which is essential for an accurate, low pressure demand valve. The use of a convoluted diaphragm has the additional advantage that, unlike a flat-type diaphragm, the effective area of a convoluted diaphragm is readily calculable, and is constant throughout its working range of movement. This feature provides functional predictability, which is essential for low pressure regulator applications.

A problem in the use of diaphragms in any breathing demand valve application, and particularly where sensitive diaphragms are used, such as convoluted diaphragms, is that of providing a means of clamping and sealing the peripheral sealing flange of the diaphragm, without subjecting the diaphragm to the effects of stress displacement likely to cause material distortion within the diaphragm body.

Conventionally, the sealing flange is merely clamped between two surfaces. In a known development, one or both of the clamping surfaces may be provided with a series of annular grooves, into which flows some of the elastomeric material which forms the flange region of the diaphragm. The flow of material into these grooves serves to grip the flange region of the diaphragm and increases the degree of sealing around the periphery of the diaphragm. However, the grooves only take up a proportion of the elastomeric flow in the flange region of the diaphragm and the remainder of the flow of elastomeric material, caused by the clamping, is into the main body of the diaphragm, which may distort the body of the diaphragm and compromise the sensitivity in the response of the diaphragm.

It is a further object of the present invention to provide a demand valve system employing a diaphragm, means being provided to clamp the diaphragm while providing a substantial reduction in the transferral of the effects of stress displacement into the diaphragm, and consequent material distortion therein.

According to another aspect of the present invention there is provided a pressure regulator suitable for use as a breathing demand valve in various self-contained breathing apparatus, comprising a primary chamber and a convoluted diaphragm, the diaphragm being mounted within the primary chamber so as to provide a fluid tight seal around the diaphragm rim, while isolating the convoluted section of the diaphragm from distortion effects due to rim clamping or sealing forces.

Embodiments of the invention are described below by way of example with reference to the accompanying drawings, in which:

DETAILED DESCRIPTION OF THE PREFERRED EMBODIMENTS

Figure 1:
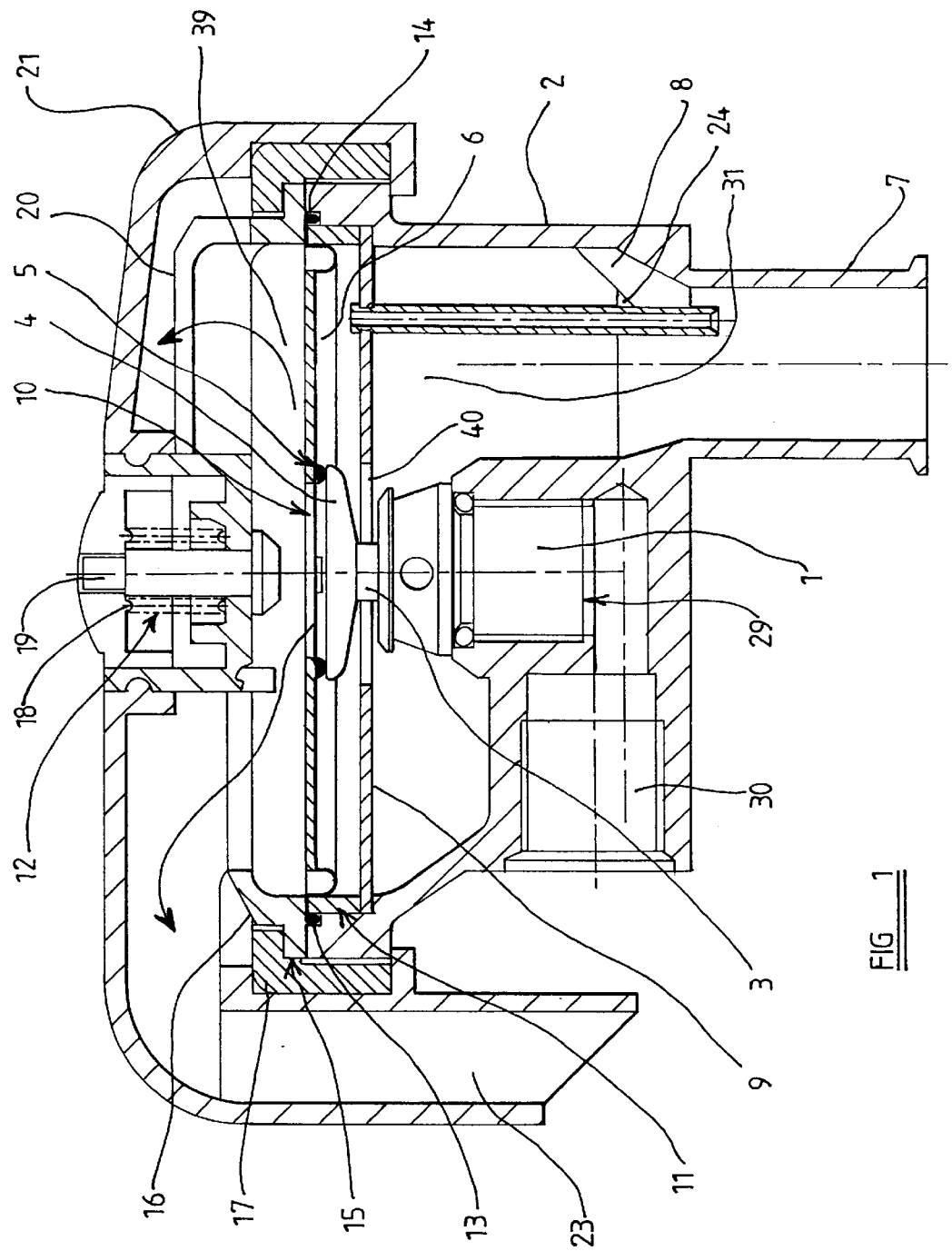
FIG. 1 is a cross-sectional view of a first embodiment of a breathing demand valve according to the present invention.

The breathing demand valve shown in FIG. 1 comprises a body 2, a cover 16 and a diaphragm 6 clamped between the body 2 and the cover 16. A first chamber 31 is defined between the diaphragm 6 and the body 12 and a breathing connector tube 7 extends from this first chamber, for connection to a face mask or the like, for the supply of breathing gas to the latter. The breathing connector 7 may be furnished with a mouthpiece or, alternatively could be connected to a half mask or full mask (not shown for the sake of clarity).

There is defined between the diaphragm 6 and the cover 16 a second chamber 39 communicating with gas exhaust means. Thus this second chamber 39 is separated from the first chamber by the diaphragm 6 and by a flange 4 (see below).

The body 2 has an inlet connection 30, for connecting to a supply of pressurised breathing gas, not shown, and which inlet communicates with an inlet duct 29. A threaded bore in body 2 extends from inlet duct 29 to said first chamber and an inlet valve module 1, of similar form to the valve module described in GB 2298026, is screwed into the threaded bore.

As explained in more detail below, the inlet valve module 1 incorporates an inlet valve member 36 which carries the flange 4 referred to above and operates to admit gas from duct 29 to said first chamber when the flange 4 is moved downwardly, (as viewed in FIG. 1), by deflection of the diaphragm 6 and operates to cut off the supply of gas from duct 29 to said first chamber when the flange is allowed to move upwardly, (as viewed in FIG. 1), by the diaphragm 6.

Figure 5:
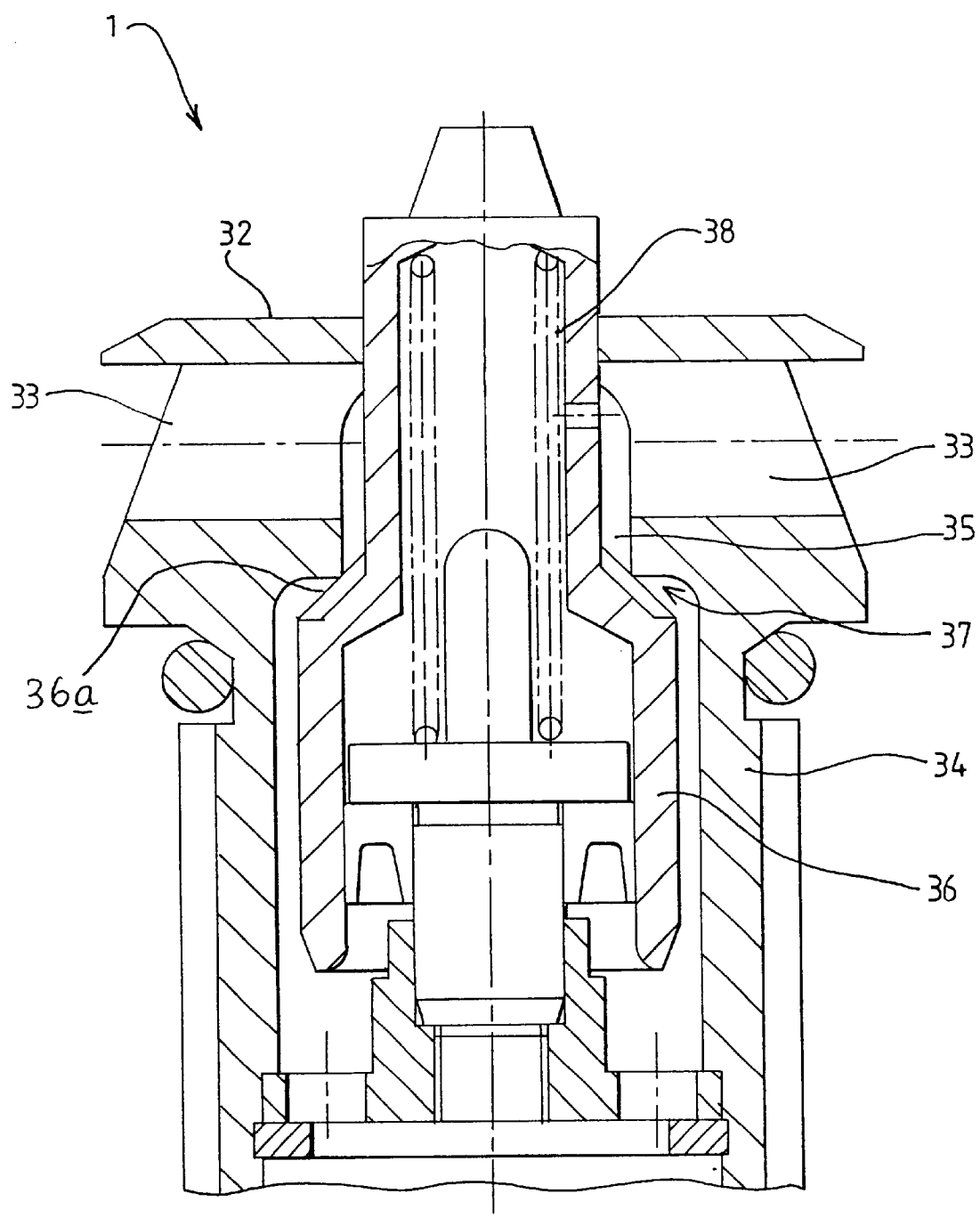
FIG. 5 shows a cross section through the inlet valve module in the demand valves of FIGS. 1, 2 and 4.

Referring to FIG. 5, the inlet valve module 1 comprises a pressure balanced inlet valve, in the form of a poppet valve, the module comprising a valve body 34, which is threadedly engaged in the screw-threaded bore in body 2, and the valve member 36 which has a shoulder 36a sealably engaging with a bead seat 37 around a valve port 35 so as to seal the first chamber 31, (FIG. 1), on the low pressure side of the valve member 36, from the pressurised gas supply on the high pressure side of the valve member 36. The valve member 36 may be biased towards the valve seat 37 by a light spring 38 or, if the valve is very slightly, and controllably, unbalanced, the biasing means may simply be the net pressure difference between the high and low pressure sides of the valve member. The inlet valve module 1 differs from that disclosed in GB 2298026 only in that it further incorporates a shroud cap 32, integral with body 34, and which, when the valve member 36 is in the open position, diverts the pressurised gas flow from the duct 29 through radial holes 33 located at the upper end of the hollow valve body 34, into the first chamber 31.

The valve member 36 of the valve module 1 has a stem 3 which extends from the valve member and into the first chamber 31 along a central axis A of the screw threaded bore in body 2, the stem 3 carrying the flange 4 at its end remote from the body 34 of the valve module 1.

The diaphragm 6 has a central aperture forming an exhaust port 10, and the diaphragm 6 has an elastomeric annulus surrounding the exhaust port 10 and forming a seat 5 which the upper side of the flange 4 can engage sealingly.

In use, the user inhales through breathing connector tube 7, removing breathing gas from within the chamber 31. The consequent net pressure difference across the diaphragm causes deflection of the diaphragm 6 towards the inlet valve module 1 which, in turn, urges the valve seat 5 against the flange 4 and causes the flange 4 with stem 3 and the poppet valve member to move downward, opening the inlet valve 1 and allowing air to flow through the inlet valve module into the chamber 31 and thence to the user. The working action of the demand valve is that of a highly sensitive breath operated reactive valve similar to a pressure regulator, except that the opening thrust is produced by inhalation by the user through the breathing connector, rather than a load spring, as is the case with a pressure regulator.

When the user exhales, the pressure in the first chamber rises so that the diaphragm 6 moves upwards, (as viewed in FIG. 1), separating from the flange 4 as the valve member in the inlet valve module 1 reaches its fully closed position, so that exhaled gas is allowed to flow to ambient via the exhaust port 10 and said second chamber 39. Exhalation gas passes to ambient through shrouded radial slots 20, which are provided in the top cover 16. A diverter cap 21 with an exhaust vent tube 23 is fitted over the top cover 16 to provide a means, when the valve is used for underwater applications, of diverting bubbles of exhaled gas leaving via the slots 20, away from the face of the user.

In the absence of the baffle plate provided in accordance with the invention, as described below, when the inlet valve 1 was in an open position, a portion of the pressurised gas flowing through the valve would impinge upon the underside of the diaphragm 6, tending to deflect the diaphragm in a direction away from the end of the poppet valve member and thus tending to close the inlet valve, so that there would be a negative feedback effect, as described in the introductory part of this specification. In order to avoid this effect, however, a rigid baffle plate 9 having a central aperture 40 is mounted across the first chamber, below, (as viewed in FIG. 1) and generally parallel with, the diaphragm 6. The stem 3 extends through the central aperture 40 in the baffle plate 9 and, at least in the closed position of the inlet valve 1, the flange 4 is located above the baffle plate 9. The baffle plate 9 acts to deflect the pressurised gas entering the first chamber from the inlet valve module 1, and which would otherwise impinge upon the underside of the diaphragm 6. Accordingly, the tendency for gas streams from the inlet valve to deflect the diaphragm 6 away from the end of the poppet valve stem 3 and thus to close the inlet valve, is largely avoided. A Venturi tube 24, having an internal chamfer at its end opposite the baffle plate 9, is fitted into the baffle plate 24 and extends downward from the baffle plate into the breathing connector tube 7, lying close to the wall of the connector tube. Venturi tube 24 tends to produce a pressure drop in the space between the diaphragm 6 and the baffle plate 9 in response to gas flow along the connector tube from the first chamber 31, thereby counteracting the negative feedback effect referred to. Furthermore the effectiveness of the Venturi tube in this respect has been found to be enhanced if, as illustrated, the Venturi tube is located close to the wall of the connector tube 7. Thus, by contrast with what would be the situation without the baffle plate 9 and the Venturi tube 24, an increase in gas outlet flow to the user tends to produce a positive, rather than a negative feedback effect.

Various subsidiary features of the demand valve of FIG. 1 are discussed briefly below.

The diverter cap 21 is rotatable around axis A so as to be adjustable to suit the orientation of the user. The diverter cap is preferably made from an elastomeric material, so that it may be stretched over the outside of a clamp ring 17, and has an inwardly facing flange fitting around the underside of the clamp ring 17. The diverter cap 21 is held against movement along, and perpendicular to, axis A by centre boss 41, through the engagement of inner bead 22, on diverter cap 21, in corresponding grooves 42 on centre boss 41.

The diaphragm 6 comprises a central, generally flat region around the exhaust port 10, a convoluted region around the flat region, adjacent the edges of the first and second chambers, and a flat peripheral region, surrounding the convoluted region, and a thicker edge portion or bead at the extreme periphery. The diaphragm is retained by the flat peripheral region being clamped between a flange 15 of top cover 16, and an opposing annular end face of the body 2. The assembly is held closed by the clamp ring 17. A spacer ring 11 is interposed between the underside of the diaphragm 6 and the edge region of the baffle plate 9, which is located between ring 11 and an opposing shoulder of the body 2.

Located in the centre of top cover 16 is a push button 18, which operates a purge mechanism for the purpose of clearing fluid from within the demand valve cavity. The push button is held in the non-operative condition by spring 12, and the purging function is effected through a pusher pin 19 acting on the top surface of flange 4. When it is required to operate the purge mechanism, the user pushes down the pusher pin 19, which acts on the top surface of flange 4 and allows purge air to flow from the inlet valve module with the exhaust valve open, so that water which has accumulated in the body of the demand valve is purged to ambient whilst, at the same time, the pressure cannot build up to a dangerous level in the diver's lungs.

Figure 2:
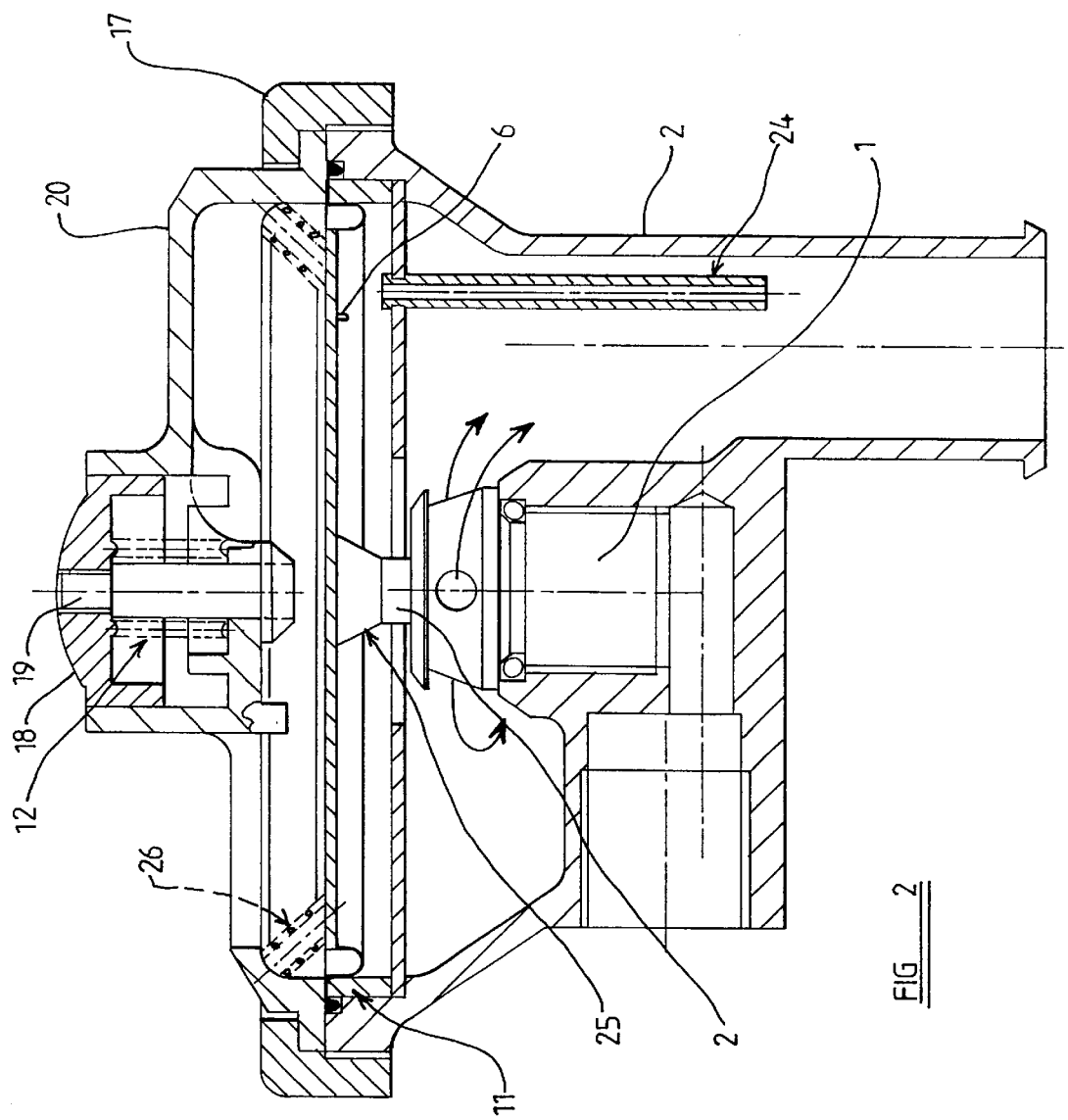
FIG. 2 shows a cross-sectional view of a second embodiment of a breathing demand valve according to the present invention.

FIG. 2 shows an adaptation to the basic design, suitable for self-contained breathing apparatus used for rescue purposes in contaminated atmospheres. It is a requirement in such applications that there is, at all times, within the face mask, an ambient pressure of 1.9" Wg, and that breathing takes place when the suction applied by inhalation reduces the ambient pressure to no less than 0.5" Wg. In this way, some positive pressure is maintained in the face mask, thus keeping out any contamination. Referring again to FIG. 2, the ambient set pressure level is provided by a suitably low rated load spring 26, fitted above the diaphragm so as to produce a small deflection of the diaphragm towards the inlet valve and actuate opening of the inlet valve to a required degree. The load spring could be adjusted in some convenient manner so as to cause the required degree of opening of the inlet valve and set a basic ambient set-pressure level as appropriate for a specific application.

The demand valve of FIG. 2 is not provided with an exhaust valve arrangement. Instead of the exhaust flange 4 of FIG. 1, a pusher 25 is mounted on the end of the poppet valve stem 3 and engages, in turn, directly with the underside of diaphragm 6.

Upon exhalation by the user, heat exchange occurs between the users breath and the baffle plate 9. In order to maximise this heat exchange, the baffle plate and Venturi tube may be made from a good heat conducter, such as aluminium. The intake of heat to the baffle plate from the exhaled breath is given back on inhalation, making for more comfortable breathing and a reduction in the risk of freezing. For the sake of clarity, the baffle plate 9 is shown as a plain disc but, for equipment required to operate in extreme conditions, it is envisaged that the lower side of the baffle plate could be furnished with protrusions, which may in the form of radial vanes, in order to increase the heat transfer area. Similarly, the baffle plate may incorporate recesses in order to increase the heat transfer area or a combination of both recesses and protrusions.

Figure 3:
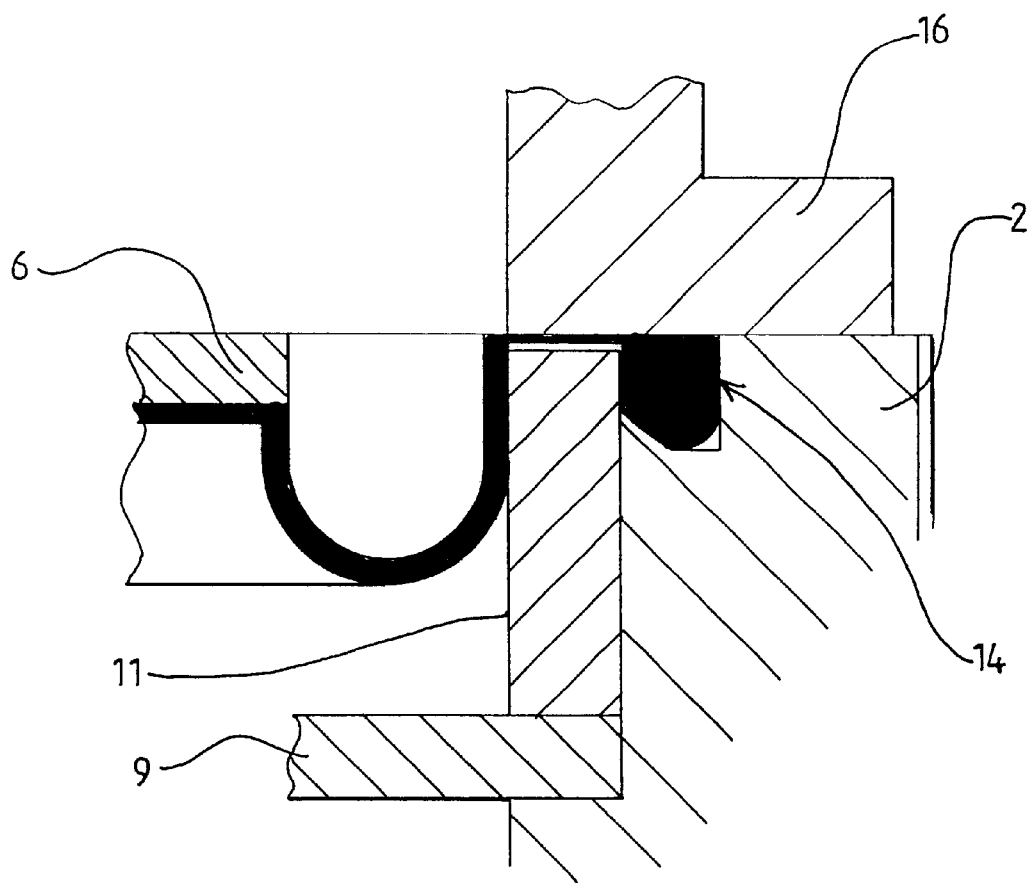
FIG. 3 shows a partial cross-sectional view of the diaphragm mounting arrangement in the breathing demand valves of FIGS. 1 and 2.

FIG. 3 shows an enlarged cross sectional view of the mounting means 55. A small peripheral rim 13 is located around the extremity of the sealing flange of the diaphragm. The rim 13 has a width of around 0.5–2 mm, preferably 1–1.5 mm, and fits into a groove 13. The groove is substantially rectangular, with part of the floor 56 of the groove being chamfered at an angle of around 30–4-degrees, preferably 35 degrees. The chamfered floor 56 of groove 14 provides a gentle wedging action which retains the rim 13 within groove 14, providing dynamic sealing around the periphery of the rim 13 while retaining any wedging distortion in the rim 13 and the groove 14. The wedging action is enhanced by the applied fluid pressure within the chamber 39 and provides a virtually stress free sealing of the periphery of rim 13 ensuring no significant flow of elastomeric material of the flange and convoluted sections of the diaphragm. A spacer ring 1 is positioned below the diaphragm flange (FIG. 1) and forms the innermost wall of groove 14. The spacer ring also serves to provide axial location of the baffle plate assembly by clamping the baffle plate against a shoulder 57 formed in body 2. A pair of lugs, or some other convenient form, provides axial location of the baffle plate 9.

Figure 4:
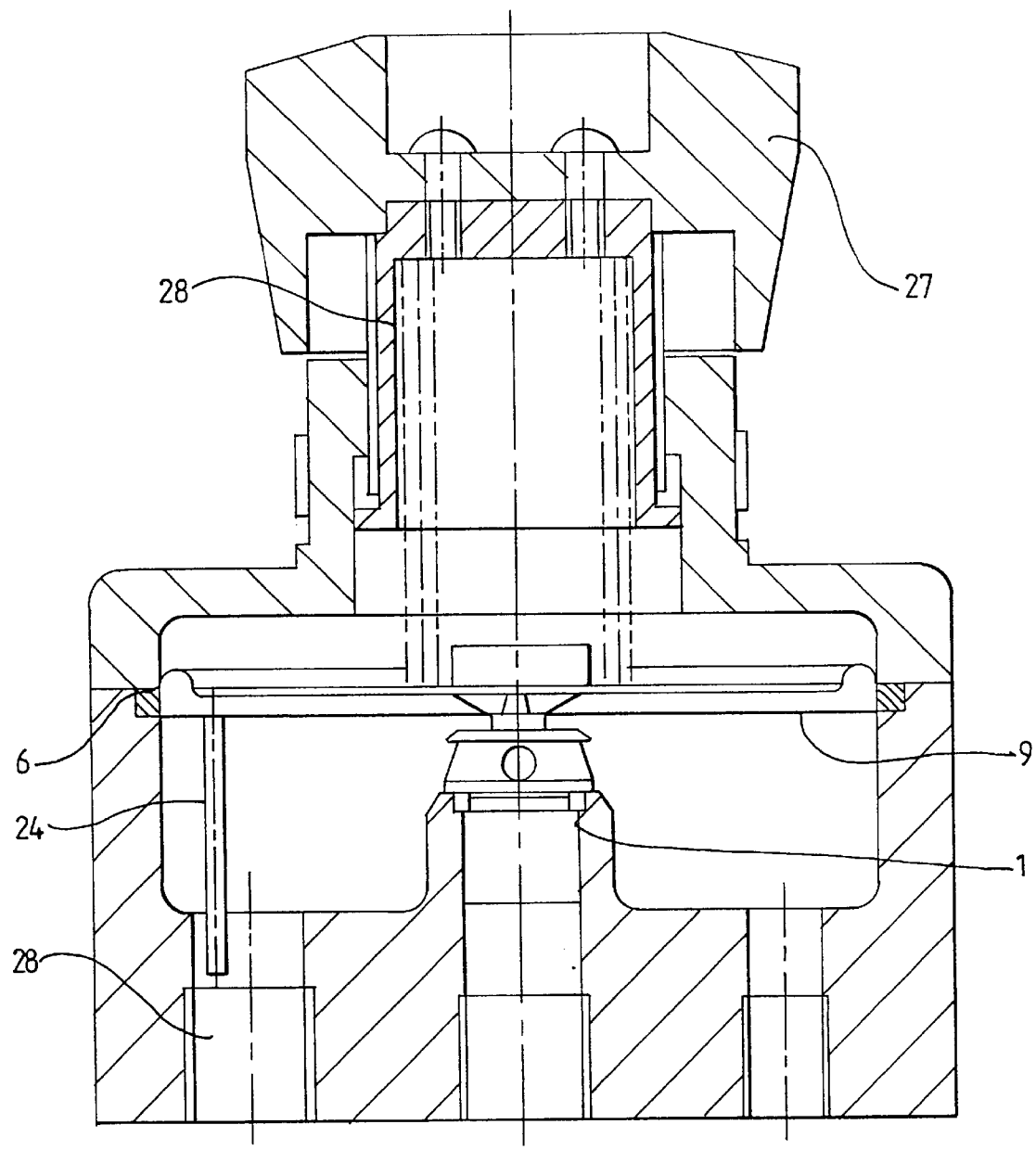
FIG. 4 shows a cross sectional view of a generic demand valve system according to the present invention.

FIG. 4 shows a generic demand valve according to the present invention, which illustrates the working principle. The design incorporates a load spring 28, which can be adjusted by knob 27. The area of the diaphragm and the load rate of the adjustment spring, along with the size and orientation of the inlet and outlet ports within the valve body, would be selected to suit the specific w application. Such a design of pressure regulator could be used to control very low pressure gases, as low as, say, 1" Wg.

FIG. 4 shows, for simplicity, a two-port valve configuration with no exhaust path to ambient. However, the arrangement can easily be modified to accommodate three ports by adding an exhaust port to the centre of the diaphragm as previously described. Thus, suitable venting to atmosphere can be provided in a similar way to the demand valve illustrated in FIG. 1. Similarly, the arrangement of FIG. 4 can easily be modified, by adding the required number of ports, so that the exhaust gas is introduced into the chamber and pressurised gas is removed from the chamber through separate tubes or ports.

Although the example illustrations are drawn and described in terms of two forms of low-pressure regulators, the "Baffle Plate and Venturi" principle can be extended to the benefit of the design of high-pressure type regulators, where high flow performance may be required, under critical, or marginal, conditions. In such a case, for example the use of a high pressure, first stage regulator for use with breathing systems, the employment of the baffle plate and Venturi tube will, by inhibiting the feedback effect, tend to reduce the pressure drop in the static set-pressure setting under heavy breathing demand conditions. In these, systems, the resultant more stable pressure supply leads directly to a better working function.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A pressure regulator suitable for use as a breathing demand valve in various self-contained breathing apparatus, comprising a first chamber having an inlet port and an outlet flow path, the inlet port being connectable to the outlet of a pressurized fluid supply, an inlet valve being positioned within the inlet port and biased so as to seal the first chamber from the pressurized fluid supply, wherein the opening of the inlet valve can be actuated by the thrust due to the deflection of a diaphragm positioned so as to separate the first chamber from a second chamber, a baffle plate positioned in between the diaphragm and inlet port reducing negative feedback to the flow rate through the first chamber by preventing a portion of the pressurized fluid flow released through the open inlet valve from impinging upon, and tending to deflect, the diaphragm in a direction tending to close the inlet valve, and wherein a Venturi tube extends from an outlet flow path such that, upon removal of fluid from the first chamber, along the outlet flow path, the pressure in the gap between the baffle plate and diaphragm is reduced by the Venturi tube accordingly.

2. A pressure regulator according to claim 1, wherein the thrust due to deflection of the diaphragm is sufficiently large to actuate opening of the inlet valve directly, without the need for any sort of lever arrangement.

3. A pressure regulator according to claim 1, wherein the diaphragm is positioned such that the necessary deflection of the diaphragm required to open the inlet valve can be achieved by removing fluid from said first chamber.

4. A pressure regulator according to claim 1, wherein the inlet valve arrangement comprises a poppet valve having a valve member and a valve stem, the valve stem extending from said valve member into the first chamber, along an axis passing through the inlet port, said valve member having a shoulder sealably engaging with a bead seat around said inlet port so as to seal the inlet port, biasing means urging the said shoulder against said bead seat.

5. A pressure regulator according to claim 1, further comprising means for introducing fluid to the first chamber.

6. A pressure regulator according to claim 5, wherein the introduction of fluid into the first chamber is via a tube communicating with the interior of said first chamber.

7. A pressure regulator according to claim 6, wherein the introduction of fluid to, and removal of fluid from the first chamber is via a single tube.

8. A pressure regulator according to claim 5 in the form of a breathing demand valve, wherein the introduction of fluid to the chamber is through exhalation by the user.

9. A pressure regulator according to claim 5, including an exhaust port connecting said first chamber with said second chamber, the exhaust port having an exhaust valve positioned therein.

10. A pressure regulator according to claim 9, wherein the exhaust port is positioned opposite said inlet valve, within said diaphragm, said valve stem having, or being connected to, at the end opposite the valve member, an outwardly extending flange, the flange co-operating with a valve seat around the exhaust port so as to function as said exhaust valve, wherein, when the diaphragm is deflected towards the inlet valve, the valve seat is urged against said flange so as to seal the first chamber from the second chamber and open the inlet valve, and when the diaphragm is deflected away from said inlet valve, a gap is formed between the valve seat and flange allowing the exhaust of fluid through the exhaust port into the second chamber.

11. A pressure regulator according to claim 1, wherein the outlet flow path is bounded by a wall and wherein the Venturi tube is positioned adjacent said wall of the outlet flow path such that the flow rate through the Venturi tube is increased by the presence of Boundary Layer Effects.

12. A pressure regulator according to claim 1, wherein the said flow path includes the interior of a tube communicating with the interior of said first chamber.

13. A pressure regulator according to claim 1, wherein the introduction of fluid to, and removal of fluid from the first chamber is via a single tube.

14. A pressure regulator according to claim 1, wherein the baffle plate is constructed from a heat absorbent material whereby, heat exchange can occur between the fluid in said first chamber and the baffle plate.

15. A pressure regulator according to claim 1, further incorporating a load spring positioned so as to deflect the diaphragm and actuate partial opening of said inlet valve.

16. A pressure regulator according to claim 15, wherein the load spring is adjustable.

17. A pressure regulator according to claim 1 in the form of a breathing demand valve, whereby removal of gas from the first chamber via said outlet flow path is through inhalation by the user.

18. A pressure regulator according to claim 1, wherein the relative position and proximity of the inlet port and a removal tube allows fluid to flow along the path between the inlet port and the removal tube at a substantially constant speed.

19. A pressure regulator according to claim 1 suitable for use as a breathing demand valve in various self-contained breathing apparatus, wherein said diaphragm is a convoluted diaphragm, the diaphragm being mounted within said first chamber so as to provide a fluid tight seal around its rim, while isolating the convoluted section of the diaphragm from material distortion due to rim clamping or sealing forces.

* * * * *

UNITED STATES PATENT AND TRADEMARK OFFICE
CERTIFICATE OF CORRECTION

PATENT NO. : 6,729,331 B2 Page 1 of 1
DATED : May 4, 2004
INVENTOR(S) : Francis Xavier Kay It is certified that error appears in the above-identified patent and that said Letters Patent is hereby corrected as shown below:

<u>Column 6,</u>
Line 62, delete the "w" after "specific"

Signed and Sealed this

Third Day of August, 2004

JON W. DUDAS
*Acting Director of the United States Patent and Trademark Office*